United States Patent [19]
Zerver

[11] Patent Number: 5,083,008
[45] Date of Patent: Jan. 21, 1992

[54] METHOD FOR THE MANUFACTURE OF DIE-FORGED OR DIE-STAMPED WORKPIECES

[75] Inventor: Hermann-Jochen Zerver, Remscheid, Fed. Rep. of Germany

[73] Assignee: Hazet-Werk Hermann Zerver GmbH & Co. KG, Remscheid, Fed. Rep. of Germany

[21] Appl. No.: 577,314

[22] Filed: Aug. 31, 1990

[51] Int. Cl.⁵ ............................................. B23K 26/00
[52] U.S. Cl. ........................... 219/121.69; 219/121.72
[58] Field of Search ...................... 219/121.68, 121.69, 219/121.65, 121.66, 121.67, 121.72

[56] References Cited

U.S. PATENT DOCUMENTS

| | | | |
|---|---|---|---|
| 3,835,912 | 9/1974 | Kristensen et al. | 219/121.64 |
| 4,081,655 | 3/1978 | Gale | 219/121.69 |
| 4,159,686 | 7/1979 | Heim | 219/121.66 X |
| 4,473,735 | 9/1984 | Steffen | 219/121.69 X |

FOREIGN PATENT DOCUMENTS 0038297 3/1981 European Pat. Off. .
3420201 12/1985 Fed. Rep. of Germany .

OTHER PUBLICATIONS

VDI-Z bd. 129 (1987) No. 6–Jun., Helmut Huber, pp. 55–59.

*Primary Examiner*—C. L. Albritton
*Attorney, Agent, or Firm*—Robert W. Becker & Associates

[57] ABSTRACT

The invention relates to a method for the manufacture of die-forged or die-stamped workpieces, in which, after the stamping or forging process, the burr on the rough workpiece is removed, and the rough workpiece is machined at least at the functional faces, and subsequently heat-treated to achieve a structural change in the material. In order to eliminate some of the machining steps and thereby achieve a faster and less expensive manufacture of the workpiece, a trajectory laser is used to remove the burr on the rough workpiece. The removal of the burr is preferably carried out after the heat-treatment of the rough workpiece, whereby the laser also produces the functional faces of the rough workpiece in the same manufacturing step.

3 Claims, 3 Drawing Sheets

METHOD FOR THE MANUFACTURE OF DIE-FORGED OR DIE-STAMPED WORKPIECES

BACKGROUND OF THE INVENTION

The present invention relates to a method for the manufacture of die-forged or die-stamped workpieces, preferably hand tools, in which, after the stamping or forging process, the burr on the rough workpiece is removed, and the rough workpiece is machined at least at those areas important for the functioning of the workpiece, and is heat-treated to achieve a structural change in the material.

In the known methods for the manufacture of die-forged or die-stamped workpieces a blank is manufactured first, for example, by cutting a piece from a plate or stamping a piece from a metal sheet. This blank is subsequently die-forged or die-stamped, whereby a burr is inevitably created at the junction plane of the top and bottom part of the die. The resulting burr at the rough stamped or the rough forged piece is then removed by a cutting tool in a press. The rough stamped or forged piece is then heat-treated, for example, by normalizing or annealing, and sandblasted afterwards. Since the burr created by the die cannot be completely removed by the cutting tool, the burr must be ground by a special grinding machine, before the areas important for the functioning of the workpiece, for example, the face of the spanner clearance on hand tools, are machined by milling or reaming. Upon the completion of this machining process another heat-treatment is performed in order to harden and temper the workpiece, followed by an adjustment process to straighten the workpiece, which is warped due to the previous heat-treatments. Despite the straightening process, the workpiece must be subsequently machined at the areas important for the functioning of the workpiece, for example, by milling, reaming or grinding. Finally it must be sandblasted again, before it may be finished by chrome plating or other surface-treatments.

The abovementioned methods require a multitude of different manufacturing steps in order to finish a rough stamped or forged piece.

It is therefore an object of the present invention to provide an improved method for the manufacture of die-forged or die-stamped workpieces, in which fewer manufacturing steps are required so that a faster and more economical manufacture of the workpiece is achieved.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
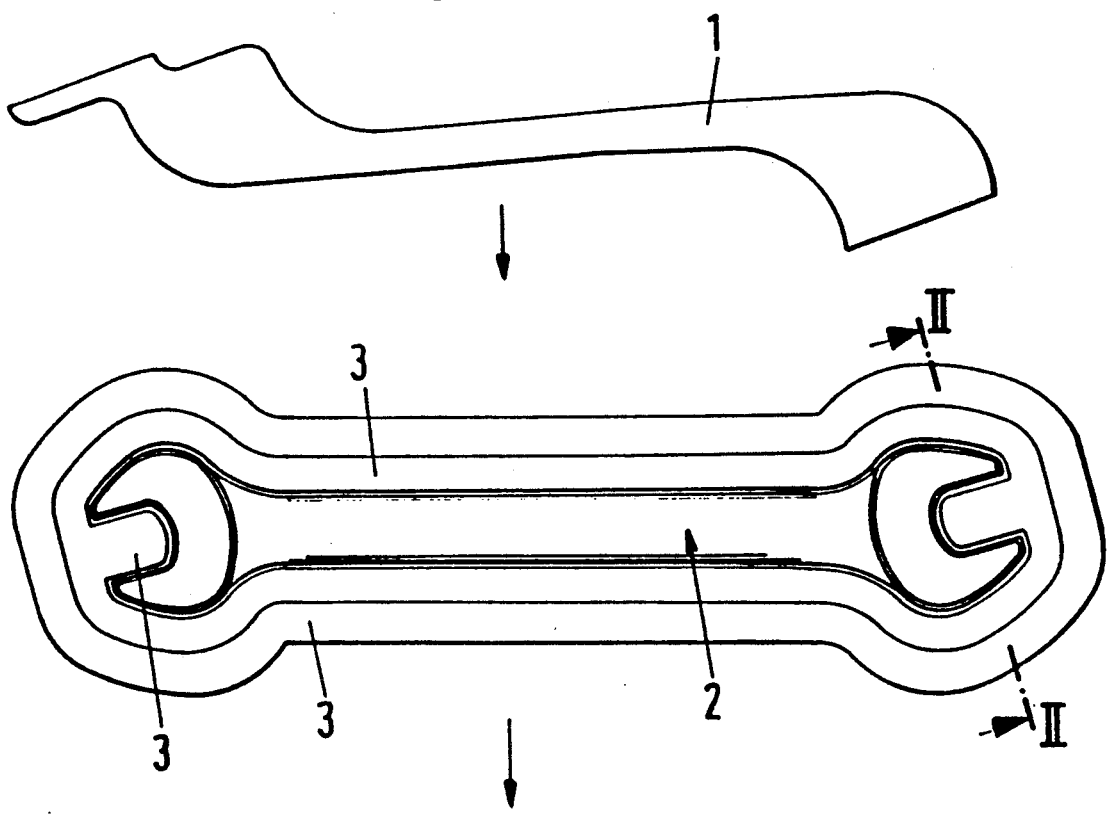
FIG. 1 is a schematic representation of the manufacturing process of a first embodiment.
Figure 1:
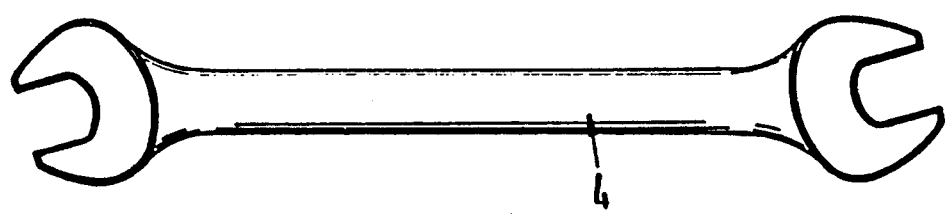

The method of the present invention is primarily characterized by employing a trajectory laser for the removal of the burr on the rough stamped or forged workpieces.

In the method according to the invention, a trajectory laser is used to remove the burr on the rough workpiece, thereby eliminating the cutting tools which are used for the removal of the burr in a press. The respective cutting tools are subject to wear and tear and expensive to replace. Also, they must be regularly adjusted according to their wear and remachined to compensate for the enlargement of the rough stamped or forged piece, due to the wear of the die. These adjustments require frequent shut-downs. Also, smaller quantities cannot be economically machined. The method according to the invention, in which a trajectory laser is employed for the removal of the burr, and is therefore well suited for smaller quantities and is also easily adjustable to the dimensional changes, i.e., enlargements, of the rough workpiece caused by the wear of the die. By using the laser, higher quality standards for the removal of the burr can be achieved, so that there is no need for post-machining in most cases.

The method according to the invention may reduce the total manufacturing time by up to 50% and also provides an environmentally safer manufacturing process, because the elimination of cutting tools for the removal of the burr eliminates the need for lubricants and cutting additives, conserves energy and reduces the noise level in the workplace.

According to a further embodiment of the present invention, the removal of the burr is carried out after the rough stamped or forged piece has been heat-treated, whereby the laser simultaneously removes the burr and machines the functional faces of the rough workpiece.

In this further embodiment of the present invention, the milling or reaming step for the machining of the functional faces of the rough workpiece is eliminated. Also in this special embodiment, the removal of the burr and the processing of the functional faces is carried out by the trajectory laser after the heat-treatment. A post-treatment of the functional faces, necessary in the prior art methods due to the warping of the workpiece, which is caused by the heat-treatment performed after the milling or reaming of the functional faces, is no longer necessary.

In this embodiment there are no lubricants, cutting additives, refrigerants or shavings from the cutting step to be disposed of. The replacement of the cutting step by the wear-resistant laser process also reduces the tool costs and the space requirements for the processing equipment. A further important advantage of the present invention is the free and unrestricted selection and optimization of the shape of the functional face, because, in contrast to the cutting process of the prior art methods, there are no pre-set limits to content with. Besides improving the quality of the workpieces, there is also up to a 50% reduction of the total manufacturing time achieved, which allows a reduction in the amount of stored goods.

A further embodiment of the present invention provides the continuous or step-wise adjustment of the trajectory of the laser, which is necessary because of the enlargement of the rough stamped or forged piece due to the wear of the die. The adjustments may easily be achieved by respective programming.

Another embodiment of the present invention allows the trajectory of the laser to be perpendicular to the surface of the burr and parallel to the functional face of the workpiece at all times. Thereby even on workpieces, which are cropped or of a complicated design, the burr may be easily removed, resulting in flawlessly machined functional faces.

DESCRIPTION OF PREFERRED EMBODIMENTS

The present invention will now be described in detail with the aid of two specific embodiments, utilizing FIG. 1 to 5.

Figure 2:
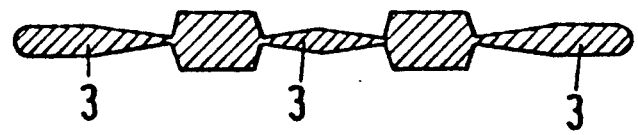
FIG. 2 is a cross-sectional view along the line II—II in FIG. 1.

The method for the manufacture of die-forged or die-stamped workpieces according to a first embodiment is demonstrated in FIG. 1, in which a hand tool, i.e., a double headed open end wrench, is shown. In order to manufacture the future hand tool, a blank 1 is cut from a plate, which is not shown FIG. 1. The blank 1 is then heated in an oven and subsequently die-forged, forming a rough forged piece 2, shown below the blank 1 in FIG. 1. The outlines of the future double head wrench are already discernible, however, a burr 3 surrounds every face of the preformed double headed wrench. The cross-sectional view of the burr 3 is shown in FIG. 2.

As shown in FIG. 1, the burr 3 of the rough forged piece 2 is removed by a trajectory laser, whereby the rough workpiece 4 in FIG. 1 is formed. The rough workpiece 4 is then hardened and straightened, if necessary, and after finishing its functional faces, i.e., the spanner clearances, is finished by polishing and a surface treatment, for example, chrome plating.

With the method described above, the cutting tools for the removal of the burr in a press are eliminated, since the burr of the rough stamped or forged piece is removed by the trajectory laser. These cutting tools are expensive and subject to constant wear. The removal of the burr carried out by a trajectory laser not only is less expensive but also assures a higher quality of the burr-free rough workpiece 4, since the trajectory of the laser may be adjusted according to the wear of the die. Therefore, it is possible to compensate for the enlargement of the rough workpiece 4, caused by the wear of the die, simply by adjusting the respective control unit.

Figure 3:
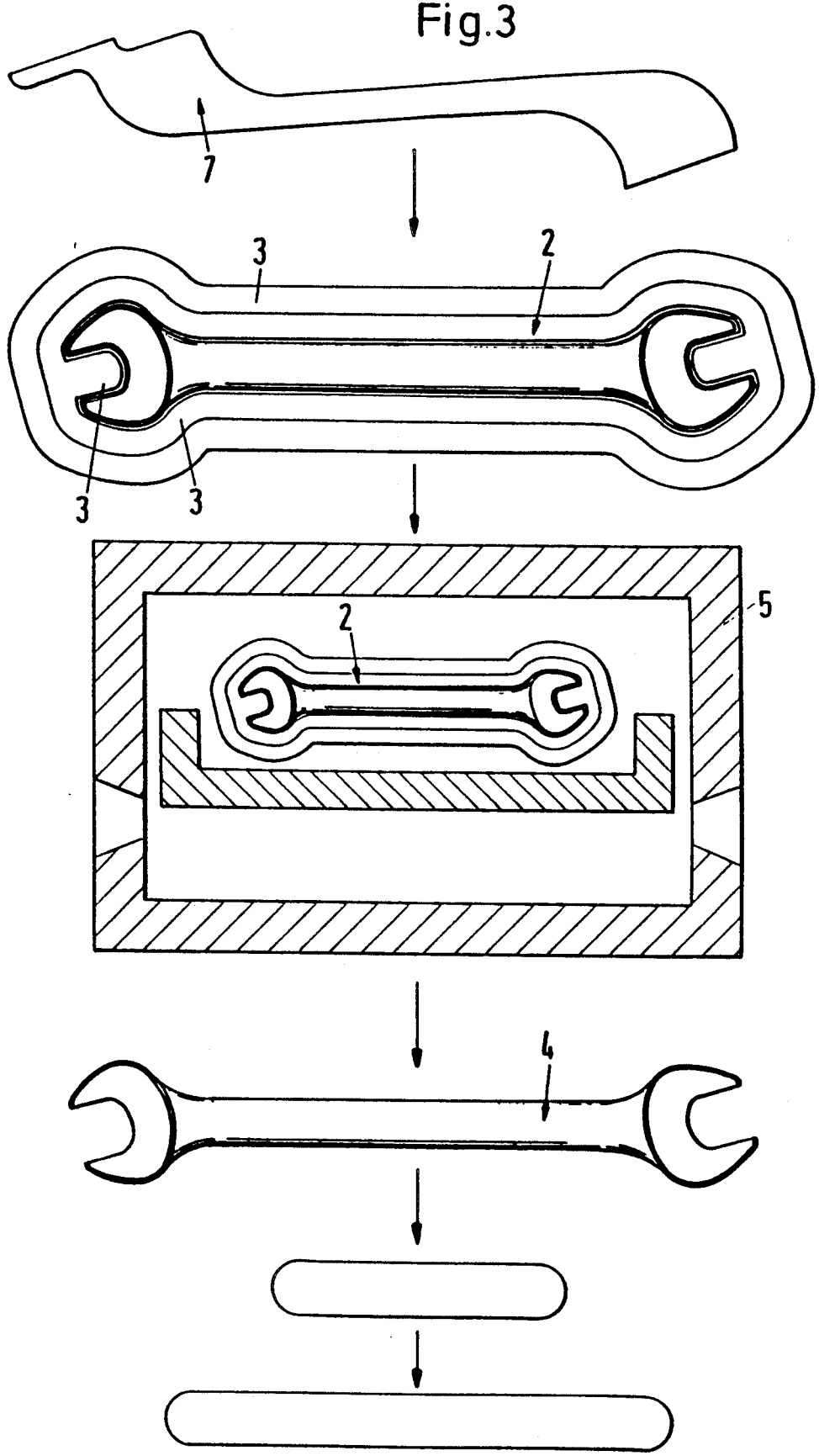
FIG. 3 is a schematic representation of the manufacturing process of a second embodiment.

In the second embodiment according to FIG. 3, the rough forged piece 2 is made from the cut blank in a die, with the burr clearly showing. In contrast to the first embodiment according to FIG. 1, the rough forged piece 2 is first hardened in an oven 5. Only after the heat-treatment is performed, is the burr of the rough forged piece 2 removed by a trajectory laser, and the rough workpiece 4, shown below the oven 5, is produced. By using a laser it is possible to remove the burr and simultaneously produce the functional faces of the rough workpiece, i.e., the spanner clearances in this example.

Since the manufacture of the functional faces is achieved with high precision and surface quality by the laser, a cutting step at the functional faces is unnecessary, when the rough forged piece 2 has been straightened after the heat-treatment. In addition to the elimination of the cutting step at the functional faces, the necessary post-treatment, i.e., grinding, of the functional faces after the hardening is also eliminated. It is sufficient to subsequently submit the rough workpiece 4, produced by the trajectory laser from the rough forged piece 2, to a polishing step and then a surface treatment, i.e., chrome plating.

Figure 5:
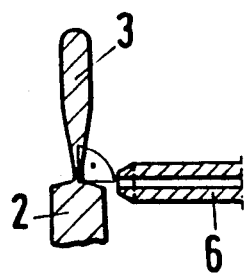
FIG. 5 shows an enlarged partial view of a workpiece during the removal of the burr by a laser.
Figure 4:
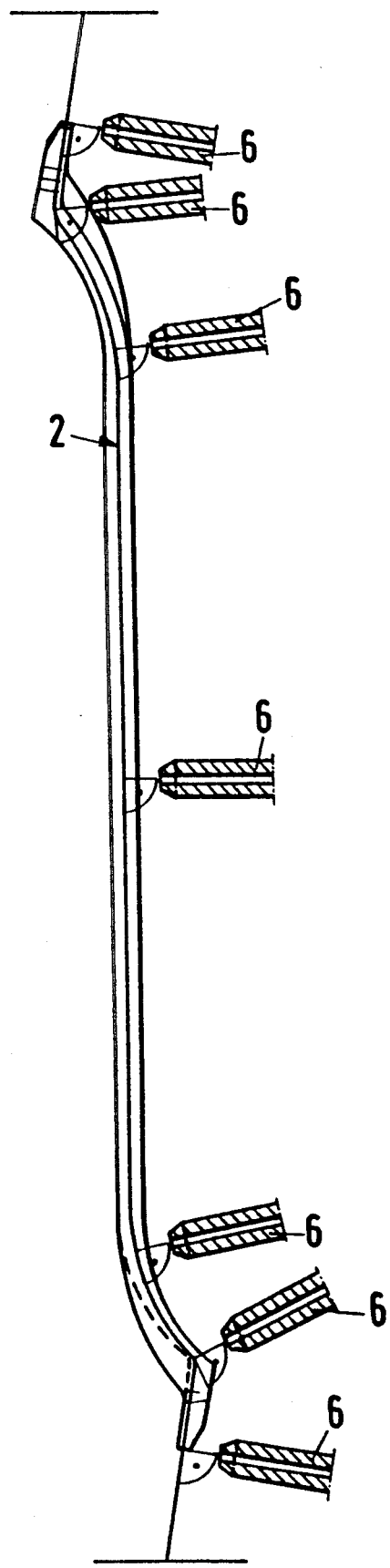
FIG. 4 shows a side view of a workpiece with a laser at various positions along the workpiece.

In FIG. 4 the side view of a workpiece in the form of a cropped box end wrench is shown. The various positions of the laser head 6, as shown in the FIG. 4, demonstrate that the laser head is guided such that it is perpendicular to the surface of the burr at all times and consequently parallel to the functional face of the rough workpiece 4, which is to be machined. FIG. 5 is an enlarged partial view of the arrangement of the laser head 6 at the rough forged piece 2.

The present invention is, of course, in no way restricted to the specific disclosure of the specification, examples and drawings, but also encompasses any modifications within the scope of the appended claims.

What I claim is:

1. A method for the manufacture of die-forged or die-stamped workpieces, comprising the steps of:
    manufacturing the die-stamped or die-forged rough workpiece;
    heat-treating the rough workpiece to achieve a structural change;
    after the heat-treatment of the rough workpiece, removing by a trajectory laser a burr on the rough workpiece, resulting from said stamping or forging step; and
    simultaneously to said removal step, machining areas important for the functioning of said workpiece with said trajectory laser.

2. A method according to claim 1 in which the trajectory of said laser is adjusted to the enlargements of said rough workpiece caused by the wear of a die.

3. A method according to claim 1 in which said laser is guided such that it is perpendicular to the surface of said burr and parallel to said area important for the functioning of said workpiece at all times.

* * * * *

UNITED STATES PATENT AND TRADEMARK OFFICE
CERTIFICATE OF CORRECTION

PATENT NO. : 5,083,008
DATED : Jan. 21, 1992
INVENTOR(S) : Zerver

It is certified that error appears in the above-identified patent and that said Letters Patent is hereby corrected as shown below:

On the Title page item:

[30] Foreign Application Priority Data

Sep. 2, 1989 [DE] Fed. Rep. of Germany 3929181

Signed and Sealed this

Twelfth Day of January, 1993

Attest:

DOUGLAS B. COMER

*Attesting Officer*    Acting Commissioner of Patents and Trademarks